3,316,270
REDDISH-BLUE BROMINE CONTAINING INDANTHRONE COMPOSITION AND PROCESS THEREFOR
Chi K. Dien, Buffalo, N.Y., assignor to Allied Chemical Corporation, New York, N.Y., a corporation of New York
No Drawing. Filed July 28, 1964, Ser. No. 385,765
4 Claims. (Cl. 260—265)

This invention relates to organic pigments of the indanthrone class and processes for producing them. It relates more particularly to novel forms of indanthrone and processes for their production.

Indanthrone (N,N'-dihydro - 1,2,2',1' - anthraquinoneazine, C.I. 69800) is a well known organic compound used as a vat dye, as an intermediate for the manufacture of other vat dyes, and as an organic pigment.

Indanthrone exists in four polymorphic crystal forms which are identified as the alpha, beta, gamma and delta forms. Manufacture of indanthrone usually involves the production of the compound in the form of a soluble leuco derivative which is then precipitated out of solution. The crystal form in which indanthrone is obtained in the course of manufacture varies with the conditions of manufacture and the subsequent treatment to which the indanthrone product is subjected.

For use as a vat dyestuff, the physical form of indanthrone is ordinarily controlled to provide a material having maximum dyeing properties and one capable of being readily shipped and stored.

When used as a pigment, the condition of manufacture and the subsequent treatment of indanthrone are controlled to give a product having the desired pigmentary properties. Of the various polymorphic forms, the gamma form has been preferred heretofore because of its reddish shade of blue, the alpha and beta forms having a greenish-blue shade and the delta form having practically no color value.

It is known to produce indanthrone in the gamma form by passing air slowly through an aqueous alkaline solution of the leuco derivative at low temperatures such as 20°–35° C. The resulting product, while reddish-blue, is a dull pigment which is tinctorially weak. Moreover, this method of manufacture requires a long period of oxidation (20–40 hours) and leads to objectionable variation in the shade of the pigment obtained. In order to overcome this variation it has been necessary to adjust the shade of the pigment thus obtained by admixture of other shading pigments with it; but since the added pigments rarely have properties identical with those of the indanthrone pigment, this leads to undesired variations in the shade of the final product (paint, lacquer, etc.) in which the pigment is used.

It is also known to prepare indanthrone in a form having superior redness of tint as compared with the gamma-form by oxidizing an aqueous suspension of the leuco form of indanthrone with a water-soluble nitro aromatic compound of the benzene series, e.g., sodium m-nitrobenzene sulfonate (U.S. Patent 2,091,102). However, this procedure requires large amounts of a costly oxidizing agent and hence is uneconomical.

My co-pending U.S. application Ser. No. 187,938, issued as U.S. Patent 3,242,182 on Mar. 22, 1966 describes a process for producing pigments wherein indanthrone is dissolved in sulfuric acid and the resulting solution is treated with a controlled amount of a reducing agent under controlled temperature conditions.

It is an object of the present invention to provide an improved process for preparing indanthrone in the form of reddish-blue pigments having enhanced tinctorial strength and brightness.

Another object of the present invention is to provide a reproducible, economical process for preparing indanthrone in the form of reddish-blue pigments.

A further object of the present invention is to provide a process for preparing indanthrone in the form of reddish-blue pigments which employs readily available inexpensive reagent, and does not require costly or elaborate equipment.

It is still a further object of the present invention to provide indanthrone in the form of reddish-blue pigments having enhanced tinctorial strength and brightness.

These and other objects will be apparent from and flow from the disclosure hereinafter set forth.

I have discovered that novel pigmentary compositions of desirable reddish-blue shade, enhanced tinctorial strength and masstone can be produced by a process which involves the bromination of indanthrone using a limited amount of bromine to produce a novel dibromo adduct of the formula

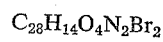

$$C_{28}H_{14}O_4N_2Br_2$$

from which substantially all of the bromine can be readily displaced by relatively simple means, such as for example by treatment with water at about 80–90° C., or with potassium iodide in acetic acid at ambient temperature.

In carrying out the process of the present invention, indanthrone is suspended in an inert non-hydroxylic, organic liquid and then reacted with a solution of bromine to form an adduct of the above-mentioned formula in which substantially all of the bromine is labile. Thereafter the adduct is treated with a monohydric alcohol and the product is washed with water. A sulfuric acid solution of the product is then "drowned" in an aqueous solution containing a reducing agent and the resultant product is refluxed in aqueous alkaline solution of a reducing sugar. Recovery of the product follows by usual means.

The aforementioned labile dibromo-adduct evolves bromine and/or hydrogen bromide when washed with alcohol and water and thereafter when dissolved in sulfuric acid. The novel reddish-blue pigmentary compositions which result on "drowning" the acid solution in an aqueous solution of a reducing agent and treating the reduction product with an aqueous alkaline solution of a reducing sugar, comprise essentially indanthrone and small amounts, e.g., 3.5% or less, of unreactive bromine-containing derivatives thereof.

It is preferable to employ as starting material indanthrone which has been purified by a sulfuric acid fractional crystallization such as that set out in Fiat Final Report, 1313, vol. II, p. 78, although crude indanthrone can be used if desired.

For suspension of indanthrone, it is preferable to employ nitrobenzene. However any inert non-hydroxylic organic compound, liquid between about 20–100° C., can be employed, such as o-dichlorobenzene, carbon tetrachloride and the like, as well as mixtures thereof. It is likewise preferable to utilize a suspension reagent which will also act as a solvent for bromine.

Bromination of indanthrone is carried out preferably in the presence of sodium chloride according to the method described in U.S. Patent 2,995,552. If desired, the pure labile bromine adduct can be recovered unchanged by washing the crude product with nitrobenzene and benzene as outlined in Example 4 below.

Any monohydric alcohol containing from one to four carbon atoms and having no more than about 5% water by weight can be used to wash the bromination product. Examples, of suitable alcohols, but which are not to be interpreted as exclusively restricted to these, are methyl alcohol, ethyl alcohol, isopropyl alcohol, n-propyl alcohol, n-butyl alcohol, and tert.-butyl alcohol.

Preferably, 95% aqueous ethyl alcohol is employed.

Excellent results are obtained by using readily available 95% U.S. grade 2B ethyl alcohol (containing about 0.5% by weight benzene).

As a reducing agent for the sulfuric acid solution of the brominated product ferrous sulfate is preferred because of its ready availability, but anhydrous ferrous sulfate or any water-soluble ferrous salt of a non-oxidizing acid or alkali metal sulfite can be used including ferrous acetate, ferrous chloride, sodium sulfite, sodium bisulfite, potassium bisulfite, and potassium sulfite.

In the subsequent treatment which insures the completion of the reduction step of the process, any reducing sugar can be used. Preferably, glucose, readily available in a crude form as corn syrup (90% glucose by weight), is employed. Conveniently the base employed in the reducing sugar treatment can be either sodium or potassium hydroxide.

Bromination of indanthrone is carried out in the presence of sufficient suspending liquid to provide a fluid, easily stirred, reaction mixture, generally about 10 to 20 parts by weight of suspending liquid per part of indanthrone. Preferably, about 15 parts by weight of suspending liquid per part of indanthrone are employed. About one or two parts by weight of sodium chloride are employed for each part of dyestuff. Especially good results are obtained when about 1.6 parts by weight of sodium chloride are employed for each part of indanthrone.

According to this invention, the quantity of bromine charged is critical and at least about one mol of bromine per mol of indanthrone should be charged to form the labile dibromo adduct. When more than about 1.3 mols of bromine per mol of indanthrone are employed, known stable bromo derivatives of indanthrone, which are pigments of an undesirable greenish-blue shade, are formed. It is preferred to use about 1.1 to 1.2 mols of bromine per mol of indanthrone. The reaction mixture should be agitated to disperse local concentrations of reagent.

Preferably about 50 mols of alcohol per mol of indanthrone are used to wash the crude brominated product. Substantially less than about 35 or more than about 60 mols of alcohol per mol of indanthrone will result in an undesirable shade of pigment.

Subsequent washing of the product with water is continued until the pH of the effluent wash liquor is greater than about 5. Congo red (pH range 3.0–5.2) is a convenient indicator for determining pH during the washing step. Excessive washing of the product with water will result in a pigment of undesirable greenish-blue shade and this is to be avoided.

At least about 7 parts by weight of 95% sulfuric acid or at least about 5 parts by weight of 100% sulfuric acid per part indanthrone are required to dissolve the bromination product. According to a preferred mode of the invention, about 10 to 15 parts by weight of 100% sulfuric acid per part indanthrone are employed.

In order to effect reduction of components of the bromination product, which may have been oxidized in the preceding steps of the process, the sulfuric acid solution is "drowned" in an aqueous solution of reducing agent, which contains preferably about 2 to 3 mols of reducing agent per mol of indanthrone. The use of more than about 4 mols of reducing agent per mol of indanthrone, while effective, serves no useful purpose. The aqueous solution of reducing agent, should contain at least about 2 and preferably not more than about 6 parts by weight of water for each part of sulfuric acid used to dissolve the bromination product in order to dissipate the heat of dilution and assist the formation of finely divided pigment particles of uniform size. While 10 or more parts by weight of water per part of sulfuric acid are effective, this amount of water is considered unnecessary.

The reducing sugar treatment can be carried out with about one mol of reducing sugar per mol of indanthrone. Preferably about 5 to 8 mols of reducing sugar per mol of indanthrone are employed. Excellent results are obtained with about 7 mols of reducing sugar per mol of indanthrone. The amount of caustic alkali present is not critical and about two mols of base for each mol of reducing sugar are conveniently employed. Similarly, the concentration of the reducing sugar soltuion is not critical and about a 0.2 M solution is used for convenience.

The bromination of indanthrone should be carried out at a temperature below about 75° C., because at higher reaction temperatures a pigment of an undesirable greenish-blue shade is obtained, and preferably the reaction is carried out at ambient temperature. Reaction temperatures as low as 0° can be employed but their use requires cooling.

The addition rate of bromine is not critical, and conveniently, in order to avoid temperature rises bromine is charged at a uniform rate, e.g., over a period of 100–200 minutes. To facilitate slow uniform addition, bromine is added in a solution containing a 10 to 12% by weight portion of reaction diluent. On completion of the addition, the reaction mixture is agitated for about 3 to 20 hours and preferably for about 6 to 16 hours.

In order to obtain a final product of reddish-blue shade, the crude product should be washed with alcohol at ordinary temperature and with water at about 25 to 75° C., and preferably at about 50–70° C. Use of water below about 50° C. generally results in a pigmentary composition of low tinctorial strength.

To obtain a reddish-blue pigment, the product should be dried at a temperature below about 100° C., and preferably, the product is dried at a temperature of about 80 to 90° C.

Likewise, to obtain a final product having the desired shade, the bromine adduct should be dissolved in sulfuric acid at about ambient temperature with vigorous agitation thereby facilitating the process of solution and assisting the dissipation of heat.

The initial temperature of the solution of the reducing agent is not critical but preferably is about 60° to 70° C. in order to enhance the production of finely divided pigment particles of uniform size. The most effective result is obtained when the initial temperature is about 70° C. During the "drowning" of the acid solution, the reaction mixture again is vigorously agitated to aid production of finely-divided pigment particles of uniform size and assist the dissipation of the heat of solution of sulfuric acid.

The mixture obtained on "drowning" in aqueous reducing agent is preferably agitated for a period of about 15 to 60 minutes. Before separating the product, if desired, water at or below ambient temperature can be added to facilitate cooling and lower the acid concentration of the mixture in order to assist in the isolation of product and reduce the hazards of handling relatively strong sulfuric acid solutions.

The reduction product is refluxed for about 30 to 90 minutes with an aqueous alkaline solution of reducing sugar. Reaction time of about one hour is preferred. On completion of the reaction, if desired, air can be passed through the mixture, for example, at about 50° C. for about 14 hours, to oxidize any leuco-compounds which may have been formed through over-reduction.

The invention will be described further in conjunction with the following specific examples, but it is to be understood that these are solely for the purposes of illustration and are not intended to limit the invention thereto. Parts and percentages are by weight and temperatures are in degrees centigrade.

*Example 1*

A solution of bromine (14 parts) in nitrobenzene (602 parts) was added dropwise over a period of two hours to an agitated mixture of acid fractionated indanthrone (32 parts), sodium chloride (50 parts) and nitrobenzene (481 parts) at 68–70°. The reaction mixture was heated for an additional 6 hours at 68–70°, cooled and filtered. The filter cake was washed with 160 parts of ethyl alcohol (U.S. grade 2B) at ambient temperature and with water at 60° until the effluent wash liquor gave a neutral reaction to Congo red paper. During the washing of the product hydrogen bromide and bromine were evolved. Bromine vapor also was generated when the dried product (32.5 parts) was dissolved in 100% sulfuric acid (458 parts) at ambient temperature with vigorous agitation.

The acid solution was drowned in a strongly agitated solution of ferrous sulfate heptahydrate (60 parts) in water (1500 parts) at 70°. The mixture was agitated for 15 minutes, diluted with 1000 parts of water at ambient temperature and filtered. The filter cake was washed free of acid with water and heated to reflux over a period of one hour with a solution of corn syrup (100 parts, 90% glucose) and potassium hydroxide (60 parts) in water (2400 parts). After refluxing for one hour, the reaction mixture was cooled to 50° and air was passed through the mass for 14 hours. The product, collected by filtration, was washed with water and dried. The product, containing 1.4% bromine was converted to a paste (310 parts) containing 281 parts of water and 0.4 part of a sodium salt of the condensation product of formaldehyde and β-naphthol sulfonic acid (Tamol N) and tested for masstone, tint and tinctorial strength in daylight against a paste of a standard reddish-blue pigment (C.I. Pigment Blue 22, Colour Index No. 69810). The differences in masstone and tint between the product and the standard were evaluated according to the following scale arranged in decreasing order of difference: very much, much, considerably, appreciably, slightly, and equal. The product was rated appreciably lighter and bluer in masstone, very much redder in tint, and 110% in tinctorial strength.

A paste of an improved indanthrone pigment prepared according to U.S. Patent 2,091,102, when compared against the same standard reddish-blue pigment, was rated very much lighter in masstone, very much redder but appreciably duller in tint, and 75–80% in tinctorial strength.

*Example 2*

The procedure described in Example 1 was repeated except that the product isolated after bromination was washed free of acid with water at ambient temperature. After drying, this material contained 6.33% bromine. The final product, however, contained 3.3% bromine and was rated as much darker in masstone, considerably redder in tint and 65% in tinctorial strength.

*Example 3*

The procedure described in Example 2 was repeated except that crude indanthrone (32 ports) was used. The final product contained 3.1% bromine and was rated as appreciably lighter in masstone, appreciably to considerably redder and slightly duller in tint, and 105% in tinctorial strength.

*Example 4*

A solution of bromine (17 parts) in nitrobenzene (60.2 parts) was added dropwise over a ten minute period to an agitated mixture of acid fractionated indanthrone (44 parts) and nitrobenzene (481 parts) at ambient temperature. The reaction mas was agitated for 16 hours and filtered. The filter cake was washed with nitrobenzene (60.2 parts) and benzene (175.8 parts) and dried at room temperature for 24 hours. Dark greyish brown crystals (59.1 parts) were obtained, which on drying at 90–100° were found to contain 26.3% bromine (calculated for $C_{28}H_{14}N_2O_4Br_2$; 26.3% bromine).

When treated with excess potassium iodide in aqueous acetic acid, the bromine-containing product liberated iodine. Titration of the latter by aqueous sodium thiosulfate indicated that the product had 24.8% active bromine. On contact with water at 80–90°, the product lost hydrogen bromide and bromine. When the product was heated in dry nitrobenzene it evolved hydrogen bromide and formed a stable monobromoindanthrone (calculated for $C_{28}H_{13}O_4N_2Br$, 15.4% bromine; found 16.8% bromine) which was stable to water at 80–90° and did not liberate iodine from potassium iodide in aqueous acetic acid.

*Example 5*

Bromine (34 parts) was added dropwise over a period of 2 hours to a vigorously agitated suspension of acid-fractionated indanthrone (40 parts) in 524 parts of technical dichlorobenzene (known commercially as "Solvent 75" and comprised mainly of o- and p-dichlorobenzene) at ambient temperature. Upon completion of the addition, the reaction mass was agitated for 16 hours at ambient temperature and filtered. Unreacted bromine was detected in the filtrate. The filter cake, which was washed with 66 parts of technical dichlorobenzene and 176 parts of benzene and dried in vacuo at ambient temperature, yielded 53 parts of dark solid which contained 35.2% bromine (calculated for $C_{28}H_{13}O_4N_2Br_3$, 35.2% bromine).

Hydrogen bromide and bromine were evolved when the brominated product (40 parts) was dissolved in 100 sulfuric acid (458 parts) at ambient temperature with vigorous agitation. The acid solution was drowned in an agitated solution of ferrous sulfate heptahydrate (60 parts in 1500 parts of water) at 70°. The mixture was agitated for 15 minutes, diluted with 1000 parts of water at ambient temperature and filtered. The filter cake was washed free of acid with water and treated with corn syrup as described in Example 1. The product, containing 14.2% bromine, was converted to an aqueous paste (310 parts, 8.4% solids content) containing 0.4 part of the condensation product of formaldehyde and β-naphthol sulfonic acid (Tamol N) and tested for masstone, tint and tinctorial strength as described in Example 1, except that artificial light was employed. The product was rated as much darker in masstone, considerably greener and slightly brighter in tint and approximately 100% in tinctorial strength.

Thus it will be seen that the process of my invention provides novel reddish-blue pigments which surpass in redness, strength and masstone the gamma-form of indanthrone conventionally prepared. The shade of the pigment prepared by this method is largely determined by the amount of bromine charged, the quantity and temperature of the washing solvents and sulfuric acid with which the labile dibromo-adduct is treated. Accordingly, the present process can be readily controlled so as to afford reproducible results with respect to the shade of pigment produced.

I claim:
1. A process for producing a bromine containing indanthrone composition in the form of reddish-blue pigment which comprises the steps of:
   (a) contacting an indanthrone suspension with about 1 to 1.3 mols of bromine per mol of indanthrone at a temperature less than about 75° C. to form an indanthrone-bromine adduct,
   (b) treating the adduct of step (a) with about 35 to 60 mols of a lower alkanol per mol of said adduct,
   (c) washing the resultant product with water at a temperature of about 25° C.–75° C.,
   (d) drying the washed product at a temperature below 100° C.,
   (e) dissolving the washed product in concentrated sulfuric acid at about ambient temperature and with rigorous agitation,
   (f) drowning the resulting sulfuric acid solution in an aqueous solution containing a reducing agent selected from the group consisting of ferrous salt of a non-oxidizing acid and an alkali metal sulfite,
   (g) recovering the resulting indanthrone pigment from the remaining solution,
   (h) refluxing the resulting indanthrone pigment in an aqueous alkali solution of a reducing sugar, and

(i) recovering the resulting indanthrone pigment from the resulting solution.

2. A process for producing a bromine containing indanthrone composition in the form of reddish-blue pigment which comprises the steps of:
   (a) contacting indanthrone, suspended in an inert non-hydroxylic organic liquid, with between about 1 mol and about 1.3 mols of bromine per mol of indanthrone at a temperature less than about 75° C. to form an indanthrone-bromine adduct,
   (b) treating the adduct of step (a) with between about 35 and about 60 mols per mol of said adduct of an alkanol having between one and four carbon atoms,
   (c) washing the resultant product with water at a temperature of about 50° C.–70° C.,
   (d) drying the washed product at a temperature below 100° C.,
   (e) dissolving the dry product with vigorous agitation in at least about 5 parts by weight of 100% sulfuric acid at ambient temperature,
   (f) drowning the resulting sulfuric acid solution in an aqueous solution containing at least about 2 mols per mol of indanthrone of a reducing agent selected from the group consisting of ferrous salt of a non-oxidizing acid and an alkali metal sulfite,
   (g) recovering the resulting indanthrone pigment from the remaining solution by filtration,
   (h) refluxing the resulting indanthrone pigment in an aqueous alkali solution of a reducing sugar, and
   (i) recovering the resulting indanthrone pigment from the resulting solution by filtration.

3. A process for producing an indanthrone composition containing about 1.4 to 3.5% by weight of bromine in the form of reddish-blue pigment which comprises the steps of:
   (a) contacting indanthrone, suspended in an inert non-hydroxylic organic liquid which is a solvent for bromine with between about 1 and about 1.3 mols of bromine per mol of indanthrone at a temperature less than about 75° C. to form an indanthrone-bromine adduct containing about 1 mol of bromine per mol of indanthrone,
   (b) treating the adduct of step (a) with between about 35 and about 60 mols per mol of said adduct of an alkanol having between one and four carbon atoms,
   (c) washing the resultant product with water at a temperature of about 50° C. to 70° C., until the pH of the washed liquor is higher than about 5,
   (d) drying the washed product at a temperature below about 100° C.,
   (e) dissolving the dry product with vigorous agitation in about 10 parts to about 15 parts by weight of 100% sulfuric acid at ambient temperature,
   (f) drowning the resulting sulfuric acid solution in an aqueous solution containing at least about 2 mols per mol of indanthrone of a reducing agent selected from the group consisting of a ferrous salt of a non-oxidizing acid and an alkali metal sulfite, said aqueous solution containing at least about 2 parts by weight of water per part by weight of said sulfuric acid,
   (g) recovering the resulting indanthrone pigment from the remaining solution by filtration,
   (h) refluxing the resulting indanthrone pigment is an aqueous alkali solution of glucose, and
   (i) recovering the indanthrone pigment from the resulting solution by filtration and subsequently drying said pigment at a temperature less than about 100° C.

4. An indanthrone composition in the form of a reddish-blue pigment wherein said composition contains about 1.4% to 3.5% bromine and wherein said composition is produced according to the method of claim 1.

References Cited by the Examiner

UNITED STATES PATENTS

| | | | |
|---|---|---|---|
| 1,847,329 | 3/1932 | Crowell | 260—265 |
| 2,089,009 | 8/1937 | Stallmann | 260—265 |
| 2,115,446 | 4/1937 | Kocberle et al. | 260—265 |
| 2,413,483 | 12/1946 | Belcher | 260—265 |
| 2,995,552 | 8/1961 | Genta | 260—265 |

OTHER REFERENCES

Lubs: The Chemistry of Synthetic Dyes and Pigments, pp. 512–524, Reinhold Publishing Corporation, New York, 1955.

Venkataraman: The Chem. of Synthetic Dyes, vol. II, Academic Press Inc., New York, 1952, pp. 931–942.

ALEX MAZEL, *Primary Examiner.*

HENRY R. JILES, *Examiner.*

JAMES W. ADAMS, JR., MARY O'BRIEN,
*Assistant Examiners.*